US006881915B2

(12) United States Patent
Lawandy et al.

(10) Patent No.: US 6,881,915 B2
(45) Date of Patent: Apr. 19, 2005

(54) CONTRAST ENHANCING MARKING SYSTEM FOR APPLICATION OF UNOBTRUSIVE IDENTIFICATION AND OTHER MARKINGS

(75) Inventors: Nabil M. Lawandy, North Kingstown, RI (US); Timothy J. Driscoll, Pawtucket, RI (US); Charles M. Zepp, Hardwick, MA (US)

(73) Assignee: Spectra Systems Corporation, Providence, RI (US)

( * ) Notice: Subject to any disclaimer, the term of this patent is extended or adjusted under 35 U.S.C. 154(b) by 100 days.

(21) Appl. No.: 10/060,767

(22) Filed: Jan. 30, 2002

(65) Prior Publication Data

US 2002/0152928 A1 Oct. 24, 2002

Related U.S. Application Data

(60) Provisional application No. 60/289,214, filed on May 7, 2001, provisional application No. 60/278,690, filed on Mar. 26, 2001, provisional application No. 60/276,631, filed on Mar. 16, 2001, provisional application No. 60/270,755, filed on Feb. 22, 2001, provisional application No. 60/270,754, filed on Feb. 22, 2001, provisional application No. 60/265,458, filed on Jan. 31, 2001, and provisional application No. 60/265,440, filed on Jan. 31, 2001.

(51) Int. Cl.[7] .................................................. G06K 9/00

(52) U.S. Cl. ....................... 209/584; 209/583; 209/900; 209/3.3

(58) Field of Search ................................ 209/583, 584, 209/900, 3.3

(56) References Cited

U.S. PATENT DOCUMENTS

| | | | | | |
|---|---|---|---|---|---|
| 3,873,181 | A | | 3/1975 | Chivian et al. | 350/3.5 |
| 4,722,595 | A | | 2/1988 | Siol | 350/353 |
| 4,731,417 | A | | 3/1988 | Miyata et al. | 525/200 |
| 4,772,506 | A | | 9/1988 | Siol et al. | 428/212 |
| 4,860,273 | A | | 8/1989 | Sawano et al. | 369/100 |
| 4,900,791 | A | | 2/1990 | Siol et al. | 525/228 |
| 4,983,817 | A | | 1/1991 | Dolash et al. | 235/462 |
| 5,057,560 | A | | 10/1991 | Mueller | 524/22 |
| 5,093,147 | A | | 3/1992 | Andrus et al. | 427/7 |
| 5,249,687 | A | * | 10/1993 | Rosenbaum et al. | 209/3.3 |
| 5,282,894 | A | | 2/1994 | Albert et al. | 106/22 |
| 5,289,547 | A | | 2/1994 | Ligas et al. | 382/7 |
| 5,291,002 | A | * | 3/1994 | Agnew et al. | 235/375 |
| 5,298,476 | A | | 3/1994 | Hotta et al. | 503/201 |
| 5,302,825 | A | | 4/1994 | Abumehdi et al. | 250/271 |
| 5,418,855 | A | | 5/1995 | Liang et al. | 380/23 |
| 5,423,432 | A | | 6/1995 | Krutak et al. | 209/577 |
| 5,430,104 | A | | 7/1995 | Siol et al. | 525/231 |
| 5,532,104 | A | | 7/1996 | Goto | 430/139 |
| 5,587,404 | A | | 12/1996 | Kroner et al. | 522/85 |
| 5,603,955 | A | | 2/1997 | Gehrke et al. | 424/484 |
| 5,614,008 | A | | 3/1997 | Escano et al. | 106/23 D |
| 5,629,512 | A | | 5/1997 | Haga | 235/468 |
| 5,659,163 | A | * | 8/1997 | Lagan et al. | 235/375 |
| 5,684,069 | A | | 11/1997 | Auslander | 524/88 |
| 5,686,725 | A | | 11/1997 | Maruyama et al. | 250/271 |
| 5,703,229 | A | | 12/1997 | Krutak et al. | 540/140 |
| 5,807,625 | A | | 9/1998 | Amon et al. | 428/195 |
| 5,916,972 | A | | 6/1999 | Eck et al. | 525/223 |
| 6,140,387 | A | | 10/2000 | Gerst | 522/79 |
| 6,149,719 | A | | 11/2000 | Houle | 106/31.14 |
| 6,159,457 | A | | 12/2000 | Mougin | 424/78.03 |
| 6,295,167 | B1 | | 9/2001 | Uematsu et al. | 359/665 |
| 6,296,189 | B1 | * | 10/2001 | Lawandy et al. | 235/491 |
| 6,385,504 | B1 | * | 5/2002 | Pintsov et al. | 700/226 |

* cited by examiner

*Primary Examiner*—Donald P. Walsh
*Assistant Examiner*—Kaitlin Joerger
(74) *Attorney, Agent, or Firm*—Harrington & Smith, LLP

(57) ABSTRACT

A method and a system is disclosed for affixing invisible or unobtrusive markings to mail pieces (4), and subsequently collecting information from the mail pieces for sorting purposes. The system includes the affixation of an optically contrasting layer (1) to a mail piece, the layer changing optically upon the application of a stimulus to present a contrasting background for imaging encoded information (3) applied over the layer and related to the mail piece.

10 Claims, 6 Drawing Sheets

LACTONE (COLORLESS) SCHEME 1 CATIONIC DYE (COLORED)
STRUCTURE 1

DIARYLETHYLENE (COLORLESS) CATIONIC DYE (COLORED)
STRUCTURE 2 SCHEME 2

Z=alkyl,aryl.ect
Y=OH,Oalkyl,Oaryl
AND OTHER HETEROATOM CONTAINING MOIETIES

DI(TRI)ARYLMETHANE (COLORLESS) CATIONIC DYE (COLORED)
STRUCTURE 3 SCHEME 3

CONTRAST ENHANCING MARKING SYSTEM FOR APPLICATION OF UNOBTRUSIVE IDENTIFICATION AND OTHER MARKINGS

Priority is herewith claimed under 35 U.S.C. §119(e) from the following Provision Patent Applications:

| Application No.: | Filing Date | Inventor(s) |
|---|---|---|
| 60/265,440 | 31 Jan. 2001 | Nabil M. Lawandy |
| 60/265,458 | 31 Jan. 2001 | Timothy J. Driscoll, Nabil M. Lawandy |
| 60/270,754 | 22 Feb. 2001 | Nabil M. Lawandy |
| 60/270,755 | 22 Feb. 2001 | Nabil M. Lawandy |
| 60/276,631 | 16 Mar. 2001 | Nabil M. Lawandy, Timothy J. Driscoll |
| 60/278,690 | 26 Mar. 2001 | Nabil M. Lawandy, Timothy J. Driscoll |
| 60/289,214 | 07 May 2001 | Nabil M. Lawandy, Charles M. Zepp |

FIELD OF THE INVENTION

This invention relates generally to systems and methods that employ bar codes and other data forms, collectively referred to herein generally as indicia, and more particularly, this invention relates to systems and method for reading indicia and to processes and materials for recording and applying indicia upon or over a substrate. Even more specifically, this invention provides a technique to enhance, during a read operation, the contrast between an indicia and the substrate upon which it appears. Being even more specific, this invention is related to systems and methods for sorting like objects based on indicia recorded upon the objects. The objects may be, but are not limited to, pieces of mail and packages. These teachings are also directed to sorting systems and methods, such as mail sorting and induction systems.

BACKGROUND OF THE INVENTION

Methods for sorting articles have become increasingly reliant upon the use of bar codes and other similar data forms for making rapid identification of items. Many of these marking systems rely upon coding that can be "read" by an electronic system. Such systems typically require illumination of the marking, optical imaging and signal processing to ascertain information carried by the marking. Advantages of such systems include offering users an ability to automate identification steps of various processes. However, certain situations can render the use of existing technology ineffective. As an example, a summary of mail sorting techniques provides an example of the challenges faced by individuals reliant upon existing technology for identification and sorting of items.

The United States Postal Service (USPS) currently sorts mail using a bar code system. In order to sort the mail, the USPS optically reads address information with an optical character recognition (OCR) imaging system. A bar code is then applied by the USPS to the mail piece, which provides for subsequent identification and sorting prior to delivery. This type of mail sorting technique is described in European Patent EP 509280-A2, entitled "Bar code translation for deferred optical character recognition mail processing—allowing use of local formats of bar code reading and sorting of mail pieces during incoming sort." For most mail pieces, reading the bar code is not a problem, as white or light colored backgrounds provide adequate contrast, thus allowing bar code imaging equipment to operate effectively.

However, it has been discovered that problems arise when colored, multi-colored or complex backgrounds lie beneath the bar code. In such instances, the nature of the substrate background typically dampens the signal to noise ratio (SNR) in the bar code imaging equipment, or otherwise causes problems, thus providing incorrect or incomplete information to system operators and/or to automated equipment that relies on a correctly read bar code. The reduced reliability in the imaging of coded information lying on top of the substrate background typically results from poor contrast between the coded information and the substrate background.

For example, business mail and periodicals often contain multi-colored graphical patterns associated with decorative elements and advertising on outer surfaces of the mail piece, and the mail piece itself may be enclosed within a transparent plastic wrapping. If a bar code or some other computer readable indicia is to be applied to and then read from the mail piece, or the plastic wrapping, then it can be realized that the underlying graphical pattern can significantly interfere with the ability of a bar code scanner mechanism to correctly read the bar code.

While at first glance it might appear that one could simply apply a neutral label to the mail piece, and then place the bar code on the label, this approach would be objectionable for a number of reasons. First, it adds cost and complexity to the mail piece marking and coding process. Second, the label might be applied over an important element of the underlying graphical pattern, such as over a telephone number or over an Internet address of a company that has placed an advertisement on the outer surface of the mail piece. Third, the presence of the label may be visually and aesthetically objectionable when located upon a carefully designed artwork pattern that forms a portion of an advertisement or some other type of message or decoration on the mail piece.

Thus, a method of solving these problems that involves the application of a contrasting label that carries bar code information is problematic, as application of a separate label may obscure important information on the mail piece and/or it may cause other problems.

There exist numerous bar code applications where the appearance of a standard black and white bar code is unacceptable. Various invisible marking schemes, some of which are represented in U.S. Pat. Nos. 5,093,147, 5,282,894, 5,423,432, 5,614,008, 5,684,069, 5,686,725, 5,703,229, 6,149,719 attempt to avoid the use of the standard black and white bar code. However, the difficulty of incorporating these schemes is often increased when the background has variable colors or markings. In general, a colored background has a spatially variable reflectivity which can serve to greatly effect the contrast of invisible markings that are presented as an alphanumeric or bar code.

Several solutions have been presented to compensate for a non-uniform background. During the early development of the fluorescent bar coding scheme used on U.S. mail, it was suggested that the color of the background could be measured in order to change the amount of material that was printed for the bar code. White envelopes of a high reflectivity would be printed with less material than manila envelopes which required more material to compensate for the lower reflection from the substrate towards the bar code reader. This approach is successful for substrates which are uniform in color, but does not solve the problem of a varied background caused by writing or printing beneath the bar code.

U.S. Pat. No. 4,983,817 attempts to solve this problem by measuring both the returned probe beam and fluorescence intensity. Since the wavelength of the probe beam is spectrally close to the returned fluorescence wavelength, it can serve as an accurate measurement of the background reflectivity. By directly measuring the background reflectivity one is able to adjust the fluorescence intensity in order to bring out the high contrast ratio required for reliable detection of the bar code. This approach, however, is limited by the degree of reflectivity of the background, and also requires a complicated reader system.

U.S. Pat. No. 5,418,855 entitled "Authentication System and Method" describes a process that contemplates use of fluorescent materials for authentication of articles through the use of invisible bar codes or other data forms. This patent describes improving imaging reliability through discrimination for wavelengths of fluorescent emission lines. However, in some cases fluorescent inks may fail to achieve total absorption of an excitation source. Furthermore, fluorescence from the ink found in the graphical images beneath or surrounding the bar code may also be detected, thus resulting in significant spatial modulation of the signals required for detection of a code or mark.

It is known that some materials formed of polymers, or mixtures of polymers, may be characterized by a lower critical solution temperature (LCST) below which a layer of the material is transparent or substantially transparent. Material that may be considered a "LCST material" may be either a simple polymer solution, or a mixture of mutually compatible polymers. Once heated above the LCST, an optical change takes place in the LCST material causing the layer to become opaque and thus visible. The use of LCST materials is known in the art, as evidenced by U.S. Pat. No. 4,722,595 entitled "Process for Displaying Optically Readable Information." Although this patent teaches the use of LCST material for coding articles, this patent does not discuss or appreciate the problems that arise when an indicia imaging or reading system encounters a low contrast between the indicia and a substrate.

The use of LCST materials to record bar codes is also known, as evidenced by U.S. Pat. No. 5,298,476 entitled "Rewritable Bar Code Display Medium, and Image Display Method and Image Display Apparatus Using Same".

Although the use of coding schemes has provided great value for certain applications, the coding schemes have not satisfied certain needs. That is, while invisible coding schemes have preserved desired visibility of important information, present systems using invisible coding schemes have failed to operate with a high degree of reliability where colored, multi-colored or visually complex backgrounds are present.

During the sorting and routing of flat mail such as plastic wrapped magazines and brochures it may become necessary to add additional information to the items. An invisible marking system is preferred in order to not obscure any information on the item. The highly colored and detailed designs of these items pose a significant problem for use with invisible bar codes.

SUMMARY OF THE INVENTION

The foregoing and other problems are overcome and the objects of the invention are realized by methods and apparatus in accordance with embodiments of this invention.

It is an object of this invention to provide an optically contrasting marking system for marking articles having colored, multi-colored or complex backgrounds so as to improve the readability of the marking indicia.

It is a further object of this invention to provide an optically contrasting marking system that is either invisible or unobtrusive when viewed over a colored, multi-colored or complex background under ambient environmental conditions, and that becomes optically contrasting to the overlying bar code or other indicia, as well as to the background, upon stimulation during a bar code or other indicia read out process.

The teachings of this invention are directed to a system and a process for marking articles with invisible or unobtrusive markings that change to optically contrasting markings upon the application of one of more external stimulus, wherein the articles may present backgrounds that have a variety of visual features. The teachings of this invention are particularly useful in marking over the backgrounds of such articles where existing marking and identification schemes do not work well due to the presence of complex, colored, and multi-colored backgrounds underneath or surrounding the marking, where such features complicate the accurate functioning of current imaging and marking read out methods. This invention may also be used successfully to mark other articles where the background may not reduce the effectiveness of existing marking schemes. Specifically, this marking scheme may be also used effectively on articles normally contrasting to the marking system selected for use (such as a black bar code indicia applied on a layer affixed to a white envelope). This invention can be used in high throughput applications for rapid sorting of numerous articles, in single use configurations, or in any variation thereof.

A method is disclosed for affixing a marking system comprised of an optically contrasting layer on top of a substrate, wherein the optically contrasting layer provides, when stimulated, a uniform background that enhances the process of imaging and/or reading an overlying indicia carrying coded information. The method includes the steps of (a) providing a single article or a plurality of articles, wherein each article has a surface that requires marking (herein referred to as substrate), (b) applying an optically contrasting material (herein referred to as layer) over the substrate, (c) applying another substance over the layer for carrying coded information related in some way to the substrate article (herein referred to as indicia), (d) and with subsequent application of a stimulus, changing the optical characteristics of at least the layer to be in an optically contrasting state so that an optically-based readout technique may reliably detect and decipher the coded information provided by the indicia.

In one embodiment the layer contains a material that contains a polymer or mixture of mutually compatible polymers. The material is characterized by a lower critical solution temperature (LCST) below which the layer is transparent or substantially transparent. Once heated above the LCST, an optical change takes place causing the layer to become at least one of optically absorbing, reflective or scattering. The material used for the indicia may also be comprised of a material that contains a polymer or mixture of mutually compatible polymers that change optically when heated above the LCST. This provides for the appearance of indicia over a uniform optically contrasting background, once heating has stimulated both the layer and the indicia. At this point, optical imaging systems may be used to reliably detect and interpret the data carried by the indicia. After adequate time for imaging has passed, the substrate, the layer and the indicia acclimate to ambient environmental conditions. The layer, and possibly also the indicia, preferably returns to the prior transparent or substantially transparent state.

In another embodiment, at least the underlying contrast enhancing layer is comprised of transparent or substantially transparent material that changes optically upon the application of a stimulus. The layer may then remain indefinitely in the optically changed condition, i.e. the contrast enhancing condition, after the stimulus has been applied.

In another embodiment the layer is comprised of transparent or substantially transparent thermochromic material and the indicia is comprised of transparent or substantially transparent photochromic material. A first, thermal stimulus is applied to initiate an optical change in the layer, and a second, optical stimulus is applied to initiate an optical change in the indicia. After adequate time for imaging has passed, the substrate, the layer and the indicia acclimate to ambient environmental conditions. The layer and the indicia preferably return to the prior transparent or substantially transparent state.

In another embodiment, the layer is transparent, substantially transparent or translucent in ambient environmental conditions. The indicia are comprised of a material that is visible under ambient environmental conditions. In this embodiment, the indicia need not change optically upon the application of a stimulus. Once subjected to appropriate stimulus, the layer changes to provide an optically contrasting background, at which point the indicia may be more reliably read with optical imaging equipment. After adequate time for imaging has passed, the substrate, the layer and the indicia acclimate to ambient environmental conditions. The layer preferably returns to the prior transparent or substantially transparent state.

In another embodiment, the indicia are comprised of an ink, such as a fluorescent or a visible ink, that is applied over the layer. The layer is comprised of a transparent or substantially transparent polymer material that changes optically above an LCST, and becomes optically contrasting to the indicia. In this embodiment, the indicia need not change optically upon the application of a stimulus. Once subjected to appropriate stimulus, the layer changes to provide an optically contrasting background, wherein the indicia may be read more reliably with optical imaging equipment. After adequate time for imaging has passed, the substrate, the layer and the indicia acclimate to ambient environmental conditions. The layer preferably returns to the prior transparent or substantially transparent state.

In one aspect this invention provides a method that includes steps of (a) providing a substrate, upon which (b) an invisible, substantially invisible or otherwise unobtrusive layer of phase change material is applied, the layer changing optically upon the application of an appropriate stimulus, upon which (c) an additional material is applied that carries coded marking information as indicia, which may be (d) optically imaged after or during application of the stimulus to the phase change material for interpretation of the marking information, and (e) preferably, but not necessarily, with subsequent return of the layer to an unobtrusive state. The stimulus causes the phase change material of the layer to assume an optical state that enhances contrast of the layer with the indicia, thereby improving the signal to noise ratio of the system reading the indicia.

In accordance with an aspect of this invention a two layer printing technique is employed, where a bottom layer includes a photochromic layer or a thermochromic layer and a top layer contains, in one embodiment, a fluorescent, invisible bar code. The bottom layer is normally invisible. Prior to reading the bar code, the bottom layer is turned from clear to colored by a flash of UV light, or by the application of heat, depending on the nature of the bottom layer (photo- or thermo-chromic.) The color change of the bottom layer serves to obscure the variable reflectivity of the background and provide a uniform reflection beneath the bar code. While the bottom layer remains in the colored state, the invisible, fluorescent bar code is read.

The photochromic layer is preferably, but not necessarily, selected such that its activation efficiency is high enough that it does not change from the colorless state during exposure to solar or ambient UV light. Since many photochromic layers are also thermochromic, the selected material also remains substantially transparent during exposure to typical ambient temperatures.

As an example, assume that the two layer system is disposed upon a multi-colored background, and both the bottom layer and the bar code are transparent. After stimulating the bottom layer, such as by being flashed by a UV light source which turns the photochromic layer from clear to black, or by the application of thermal energy to make the thermochromic layer visible, the overlying bar code can be readily detected by a simple reader.

The photochromic bottom layer may turn from clear to a particular color instead of to black. The bar code may be absorptive instead of fluorescent. In this embodiment the contrast is provided by a varied absorptivity from the bar code structure as opposed to the color of the photo/thermochromic layer. The bar code containing top layer may also be alphanumeric in design, as opposed to the spatial contrast provided by linear or two dimensional bar codes. In this embodiment the printed information can be read by an imaging system.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention employs selected materials to provide for an invisible or unobtrusive marking system wherein a marking does not obscure underlying and/or surrounding information under ambient environmental conditions, while the marking system provides a degree of marking quality necessary to permit use of optical imaging systems for reliable interpretation of the marking.

It should be realized that the teachings of this invention could be employed to mark and subsequently identify one to many articles. This system can therefore be used in a wide variety of applications ranging from instances where invisible or unobtrusive markings may be read on an infrequent basis, to large scale sorting applications and other similar processes. These teachings are thus not limited for use with mailing systems, but can be applied in a number of different types of application, including as non-limiting examples the marking and sorting of bank checks and the marking and possible sorting of manufactured items. Thus, while the teachings of this invention will be described below primarily in the context of the marking, identification and sorting of mail pieces, those skilled in the art should recognize that the teachings of this invention can be employed in a large number of identification and sorting applications.

Figure 1:
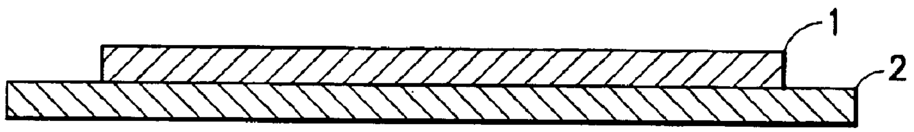
FIG. 1 shows in cross-section, not to scale, the layer applied over a substrate.

In FIG. 1 a cross-sectional view of a substrate 2 is presented, with a layer 1 of normally unobtrusive phase change material applied over the substrate 2. Application of the layer 1 of unobtrusive phase change material upon the substrate 2 may be accomplished in a variety of ways. The specific needs of the application for the marking system may dictate the method used. Factors that may be considered in the selection of the method for application of the layer 1 comprise: cost of application; cost of materials; durability; toxicity; desired thickness; ease of application; time required to complete each individual application; response time to the stimulus; properties of imaging equipment; properties of the stimulus; and properties of the substrate 2. A number of techniques may thus be used to apply the layer 1, with each technique offering unique advantages. Methods for application of the layer 1 may include painting, rolling, spraying, sticking, stamping or use of an intermediate transfer mechanism such as a transparent or substantially transparent label.

The layer 1 may be comprised of any of a variety of phase change materials. In a preferred embodiment, the layer 1 is comprised of a material that contains a polymer or mixture of polymers. The preferred polymer containing material is transparent or substantially transparent under normal ambient environmental temperature conditions. The preferred mixture undergoes a phase change when heated above a lower critical solution temperature (LCST) and becomes optically non-transparent (e.g., colored, white, opaque or cloudy). This type of polymer mixture is referred to herein for convenience as LCST material.

Specific examples of polymer containing materials that may be employed with this invention are contained in the following table, included herein for purposes of illustration only, and are not intended to be limiting of the invention, or any embodiment thereof, unless specified.

| POLYMER I | POLYMER II | Comments |
|---|---|---|
| Acrylonitrile-co-αα-methylstyrene | n-butyl methacrylate-co-methyl methacrylate | I was 30 wt % acrylonitrile, II was 70 wt % methyl metracrylate |
| | ethyl methacrylate | I was 30 wt % acrylonitrile |
| | ethyl metracrylate-co-methyl metracrylate | I was 30 wt % acrylonitrile; II was 30 or 60 wt % methul metacrylate |
| | methyl methacrylate | I was 30 wt % acrylonitrile; II was a atactic or isotactic |
| Acrylonitrile-co-styrene | ϵϵ-caprolactone | I was 28% acrylonitrile |
| | methyl methacrylate | I was 28% acrylonitrile |
| Bisphenol A carbonate; (oxycarbonyloxy-1,4-phenylene isopropylidene-1,4-phenylene) | ϵϵ-caprolactone | — |
| Butyl acrylate | Chlorinated ethylene | — |
| | Vinyl chloride | — |
| Butyl methacrylate | 2-(hydroxy hexa-fluorosoisopropyl)styrene-co-styrene | II was 90.3–90.8 mol % styrene |
| ϵϵ-caprolactone | Chlorinated ethylene | II was 30 wt % Cl |
| Carbon monoxide-co-ethyl acrylate-co-ethylene | Vinyl chloride | I was 13.8/7.41/78.8//carbon monoxide/ethyl acrylate/ethylene |
| Cellulose acetate | 4-vinylpyridine | I was 10H/2 glucose |
| Chlorinated ethylene | Ethylene-co-vinyl acetate | I was 35.4–52.6 wt % Cl; II was 40–45 wt % vinyl acetate |
| | Methyl methacrylate | I was 5052 wt % Cl |
| Chlorinated isoprene | Ethylene-co-vinyl acetate | I and II were commercial samples |
| Chlorinated vinyl chloride | Chlorinated vinyl chloride | I and II differed in composition by 3–4% Cl |
| | Vinyl chloride | I was ≦≦61.3% Cl |
| o-chlorostyrene | Styrene | — |
| o-chlorostyrene-co-p-chlorostyrene | 2,6-dimethyl-1,4-phenylene oxide styrene | — |
| | | I was 71–92 mol % ortho isomer |
| o-chlorostyrene-co-o-fluorostyrene | 2,6-dimethyl-1,4-phenylene oxide | I was about 14–40 mol % ortho-chloro isomer |
| p-chlorostyrene-co-o-fluorostyrene | 2,6-dimethyl-1,4-phenylene oxide | I was 66–74 mol % para isomer |
| Chlorosulfonated ethylene | Vinyl chloride | I was 1% S as $SO_2Cl$, 42 wt % Cl |
| 2,6-dimethyl-1,4-phenylene oxide | o-fluostyrene-co-p-fluorostyrene | II was 10–38% para isomer |
| | o-fluorostyrene-co-styrene | II was 9–20 mole % styrene |
| | p-fluorostyrene-co-styrene | II was about 22–54 mol % styrene |

-continued

| POLYMER I | POLYMER II | Comments |
|---|---|---|
| Dodecamethylene decamethylene dicarboxylate | Vinyl chloride | — |
| Dodecamethylene dodecamethylene dicarboxylate | Vinyl chloride | — |
| Ethyl acrylate | Vinylindene fluoride | — |
| Ethyl methacrylate | 2-(hydroxy-hexafluoro-isopropyl)styrene-co-styrene | II was 90.3–98.9 mole % styrene |
| | vinyl chloride-co-vinylidene chloride | II was 86.5 wt % vinylidene chloride |
| | vinylidene fluoride | I was syndiotactic or atactic; LCST below m.p. of II if I was high mol. Wt. Isotactic |
| Ethylene-co-vinyl acetate | Vinyl chloride | I was 30 or 37 wt % ethylene |
| Ethylene oxide | Oxyphenylene-sulfonyl-phenylene | — |
| Hexadecamethylene dodecamethylene dicarboxylate | Vinyl chloride | — |
| 2-(hydorxy-hexafluoroisopropyl)styrene-co-styrene | Methyl methacrylate | I was 90.3–96.1 mole % styrene |
| | Vinyl methyl ether | I was 90.3-99.9 mole % styrene |
| Methyl acrylate | Vinylidene fluoride | — |
| Methyl methacrylate | Vinyl chloride | I was atactic |
| | Vinyl chloride-co-vinylidene chloride | I was atactic or sitactic; II was 86.5 wt % vinylidene chloride |
| | Vinylidene fluoride | LCST above decomposition T of I |
| Neopentyl adipate | Oxy-2-hydroxytrimethylene-1,4-phenyleneisopropylidene-1,4-phenylene;(Phenoxy resin) | — |
| | Vinyl chloride-co-vinylide chloride | II was Saran, 86.5 wt % vinylidene chloride; LCST above m.p when ≦≦50 wt % I |
| Oxycarbonyloxy-2,6-dimethyl-1,4-phenyleneisopropylidene-3,5-dimethyl-1,4-phenylene | Styrene | — |
| n-propyl methacrylate | Vinyl chloride-co-vinylidene chloride | II was 86.5 wt % vinylidene chloride |
| Styrene | Vinyl methyl ether | I was hydrogenated or deuterated |
| Vinyl methyl ketone | Vinylidene fluoride | — |

Figure 10:
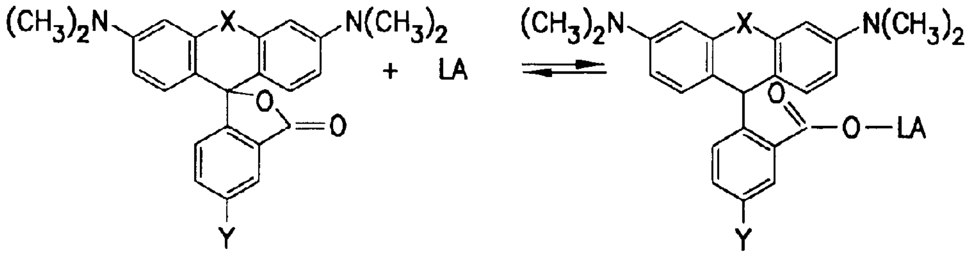
FIG. 10 shows the chemical structures of thermochromic compositions of polymer mixtures used in combination with dye formers and Lewis Acids.
Figure 10:
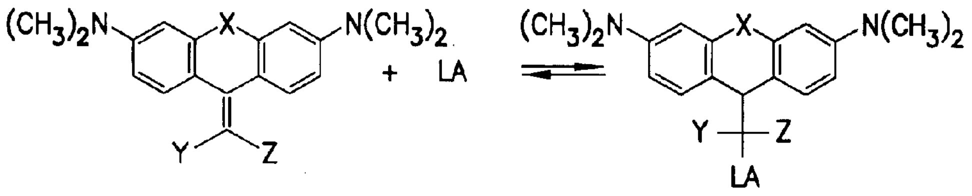
Figure 10:
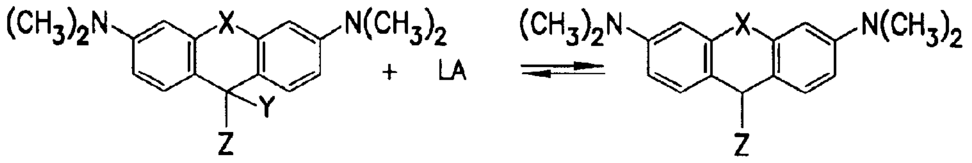

Since the opacity formed upon heating a polymer mixture or solution above the LSCT can be caused by phase seperation of two or more polymers with differing chemical properties, it became apparent that the formation of two very different environments could provide a basis to "turn on" a dye. It was reasoned that a color former when combined with a Lewis acid in the presence of an LCST mixture, the Lewis acid would be complexed to the more Lewis basic polymer and would be unavailable to cause formation of the colored form of a color former. It was further reasoned that once heated to the point of phase separation, enough Lewis acid and color former would be left in the less Lewis basic component to cause the formation of the colored form of the color former. In concept, any color former and Lewis acid pair could be used. FIG. 10 shows the chemical structures of three different schemes that were found suited to this invention. A series of combinations were tested through the process described herein.

In order to test this concept, a LCST polymer solution was made by taking 12 grams of a 50% aqueous solution of poly(methyl vinyl) ether (Aldrich #18.272-9), which was placed in a 200 ml round bottom flask along with 100 ml of benzene. A stir bar was placed in the flask which was then heated in an oil bath. Once reflux was reached, the water was azeotropically removed through use of a water separator equipped with a condenser. Once the water was removed to give a clear benzene solution, toluene was added in portions as the benzene was removed by distillation. In the end, a clear toluene solution containing 6 grams of poly (methyl vinyl) ether dissolved in 50 ml of toluene was obtained. To this solution was added a solution of 4 grams of polystyrene (Aldrich #33,165-1) dissolved in 50 ml of toluene. Aliquots of the binary polymer solution were coated on glass slides and air dried to give clear films with a rubbery texture. Heating the slides over a heat gun (temperature about 100–150 ° C.) caused the clear film to turn opaque white. Upon cooling, the films returned to their clear form.

The color formers were made up in tetrahydrofuran (THF) at a concentration of 50 mg/ml, and the Lewis acids were made up in methanol at 250 mg/ml. To prepare the thermochromic mixture, various amounts of the color former solutions were mixed with varying amounts of the Lewis acid solutions and this was added to 1.0 ml of the polymer solution. The amount of color former used was 20, 40, 60, 80, and 100 μl of the THF solution, (1, 2, 3, 4 and 5 mg of color former) per 1.0 ml of polymer solution and the amount of Lewis acid used was 4, 8, 12, 16 and 20 μl of the methanol solution (1, 2, 3, 4 and 5 mg of Lewis acid) per 1.0 ml of the polymer solution. When these mixtures were spotted on a glass plate and air dried, a colorless clear polymer film formed which was had a rubbery texture. These films, when heated became intensely colored and faded quickly over a few minutes back to the original colorless form upon cooling. Generally, 5 milligrams per milliliter of both the Lewis acid and color former was preferred.

Color formers that are operable in this system include, but are not limited to, lactone color formers, di(tri)aryl methane carbinol and ether color formers and the diarylethylene color formers. Lewis acids that are operable in this system include any of those found in carbonless copy papers such as phenols, metal ions and boronic acids.

Specific examples of color formers and Lewis acids that fulfill the requirements of this invention are contained in the following table, included herein for purposes of illustration only, and are not intended to be limiting of the invention, or any embodiment thereof, unless specified.

| COLOR FORMER | LEWIS ACID |
|---|---|
| Scheme I: | 3-nitrophenylboronic acid |
| Crystal violet lactone | 3,4-dichlorophenylboronic acid |
| Rhodamine B base (RBB) | 4-fluorophenol |
| Malachite green lactone | 2,4-di-t-butylsalicylaldehyde |
| Scheme II: | 3-methoxyphenylboronic acid |
| 1,1-(4-dimethylaminophenyl)ethylene | 4-fluorophenylboronic acid |
| Scheme III: | 4-chlororphenylboronic acid |
| 2,2-bis-(4-dimethylaminophenyl)-1,3-dithiolane | 2,4-difluorophenylboronic acid |
| Leucocrystal violet cyanide (LVC) | 9-hydroxyboroxarophenanthrene |

The best reversible color formation occurred when crystal violet lactone or malachite green lactone and the polymer mixture was used in conjunction with either 3-nitrophenylboronic acid or 3,4-dichlorophenylboronic acid as the Lewis acids. Rhodamine B base used with the polymer mixture and any of the Lewis acids gave a mixture that turned from light to dark pink upon heating above the LCST. Scheme 2 or scheme 3 color formers when combined with a Lewis acid and the polymer mixture gave an irreversible color change when heated above the LCST.

Color formers in combination with Lewis acids properly introduced into a LCST material may be selected for use in the layer 1.

Other materials for use in the layer 1 include compositions of thermochromic or photochromic substances, including various dyes. Examples of thermochromic or photochromic dyes that fulfill the requirements of this invention are contained in the following table, included herein for purposes of illustration only, and are not intended to be limiting of the invention, or any embodiment thereof, unless specified.

It should be noted that some materials exhibit both photochromic and thermochromic properties, included are those materials identified with an asterisk in the following table. In some instances it may be desirable to add a traditional dye to increase the coloration of a thermochromic dye.

| Dye | Photo-chromic | Thermo-chromic | Off State | On State |
|---|---|---|---|---|
| Spiropyrans* | yes | Yes | clear | Colored |
| Spirooxazines* | yes | Yes | clear | Colored |
| Chromenes* | yes | Yes | clear | Colored |
| Fulgides* | yes | No | clear | Colored |
| Filgimides* | yes | No | clear | Colored |
| Diarylethenes* | yes | No | clear | Colored |
| Spirodihydroindolizes* | yes | Yes | clear | Colored |
| azo compounds* | yes | No | clear | Colored |
| polycyclic aromatic compounds* | yes | No | clear | Colored |
| Anils* | yes | No | clear | Colored |
| polyciclic quinones* | yes | No | clear | Colored |
| Perimidinesspirocyclo-hexadienones* | yes | Yes | clear | Colored |
| Viologens* | yes | No | clear | Colored |
| Trialylmethanes* | yes | No | clear | Colored |
| schiff bases | no | Yes | colored | Clear |
| merocyanines | no | Yes | colored | Clear |
| cholesteric liquid crystals | no | Yes | clear | Colored |
| bianthrones | no | Yes | colored | Clear |

Other materials for use in the layer 1 include compositions of responsive materials in a microencapsulated form. U.S. Pat. No. 4,285,720 entitled "Encapsulation Process and Capsules Produced Thereby" describes the process of producing a disbursed suspension of material in a microencapsulated form, which is preserved until released by some instrumentality. The use of known technology for microencapsulation, in combination with selected Lower Critical Solution Binary Polymer Blends and Solutions (LCSPBS) provides for additional temperature sensing materials that may be useful in the layer 1. In addition to other methods, these materials may be applied to the substrate 2 in at least a liquid, or a solid solution form through use of a cuvette.

In one embodiment, polyethylene oxide in water is selected. This mixture is clear at room temperature and below, and becomes scattering above a certain temperature where there is phase separation. Microcapsules measuring approximately five to one hundred micrometers are formed of this mixture. These microcapsules are then mixed with a binder or polymer that has a matched index of refraction for formation of a transparent layer 1.

In another embodiment, a material formed of hydroxpropyl cellulose in water in a micro encapsulated form is selected for use in the layer 1. More specifically, a layer can be formed on a substrate, where the layer contains hydroxpropyl cellulose and water with a curable polymer constituent material to create a gel or a solid.

Other materials for use in the layer 1 include phase change materials that are doped with a dye or pigment. In certain instances, it may be desirable to maintain the temperature of a substrate 2 under optical irradiation within certain limits. By coating the substrate 2 with the phase change layer 1 that goes from transparent or substantially transparent to optically scattering, this can be accomplished. When the temperature of the substrate 2 becomes sufficiently high the layer 1 changes to a scattering state, preventing the incident energy from heating the surface as efficiently and allowing it to cool. The interplay of the two effects results in a stabilized temperature near the phase change temperature of the coating. Doping the layer 1 of phase change material with an absorbing dye or pigment can create an optical limiter. When light energy resonant with the absorption of the dye is incident, the light heats the layer 1 material. As the temperature increases, the doped layer 1 material becomes optically scattering, increasing the length of the diffusive light paths and further increasing the absorption and heating rate. Once the critical temperature is reached, the doped layer 1 material is fully scattering and further attenuates the transmitted energy in comparison to the same phase change material without the dopant.

Figure 2:
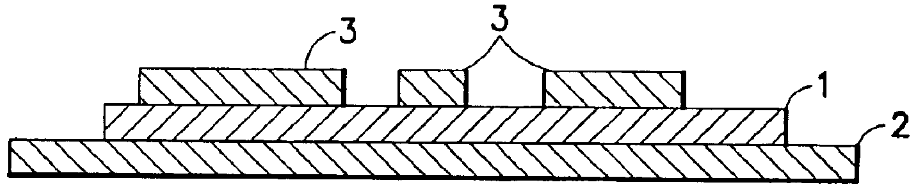
FIG. 2 shows in cross-section, not to scale, the indicia applied over the layer, and the layer applied over the substrate.

FIG. 2 presents a cross-sectional view of the indicia 3. The indicia 3 are applied over the layer 1. The indicia 3 carry coded information that marks the substrate 2 with information that is appropriate for the intended identification purposes. The coded information carried by the indicia 3 may be in the form of any suitable type of bar code, and/or alphanumeric printing, and/or a geometric or other coding system providing a suitable dataform symbology.

Other materials for use in the layer 1 and/or indicia 3 include phase change materials, combined with amplifying media, as described in U.S. Pat. No. 5,448,582, entitled "Optical Sources Having a Strongly Scattering Gain Medium Providing Laser-Like Action." By employing this combination of materials, the layer 1 can go from a non-lasing state to a lasing state upon an increase in temperature.

Similarly, materials may be selected for use in the layer 1 or indicia 3 that are highly reflective, scattering or absorbing at one or more specific wavelengths. Wavelength specific materials may be selected for a variety of reasons, including but not limited to, addressing limitations of imaging equipment, or providing for multiple applications of the invention in one location on a substrate.

The indicia 3 may be applied over the layer 1 in a variety of configurations. Suitable methods for the application of the indicia 3 include impact printing, ink jet printing, painting, rolling, spraying, sticking, stamping or the use of an intermediate transfer mechanism such as a transparent or substantially transparent label.

The indicia 3 may be comprised of the same or similar phase change materials used in the layer 1, and that still provide optical contrast between the indicia 3 and the layer 1 when in the stimulated state. The indicia 3 may also be comprised of materials that are fluorescent, opaque or otherwise contrasting to the layer 1, when compared to the layer 1 in a stimulated state. The specific needs of the application for the marking system may dictate the materials selected for use in the indicia 3. Factors that may be considered in the selection of the method for application of the indicia 3 can include, but need not be limited to, one or more of: cost of application; cost of materials; durability; toxicity; desired thickness; ease of application; time required to complete each individual application; response time to the stimulus; properties of imaging equipment; properties of the stimulus; properties of the layer 1; properties of the substrate 2.

Figure 3A:
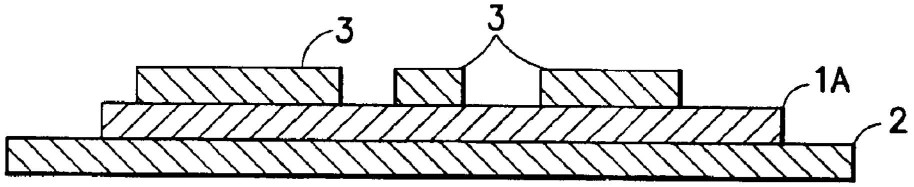
FIG. 3*a* shows in cross-section, not to scale, the combination of the indicia and the layer after stimulation, wherein the indicia is in an unchanged condition, and the layer forms an optically contrasting background to the indicia.
Figure 3B:
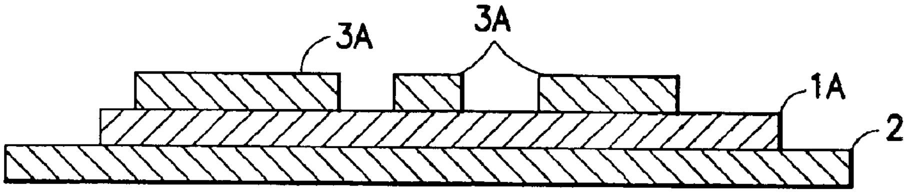
FIG. 3*b* shows in cross-section, not to scale, the combination of the indicia and the layer after stimulation, wherein the indicia is in a stimulated condition, and the layer forms an optically contrasting background to the indicia.

FIGS. 3*a* and 3*b* depict the layer 1A after stimulation. The stimulation has caused a phase change in the layer 1A material that has prompted an optical change in the layer 1 material. In FIG. 3*a*, the layer 1A is an optically contrasting background to the indicia 3, as the layer 1A at least partially obscures the substrate 2 while in the stimulated state.

As employed herein the phrase "optically contrasting" implies that the layer 1 becomes partially or totally opaque such that visibility of the underlying background is impaired, obscured or blocked at one or more wavelengths. The wavelength or wavelengths need not be visible to the human eye, and could correspond to readout and/or illumination wavelength(s) of a selected indicia reading system. The desired goal is to improve the readability of the indicia 3 against the substrate 2, preferably during the time that the indicia 3 is being read, and more preferably only during the time that the indicia 3 is being read, and to do so in an unobtrusive manner. Preferably then, the layer 1, when in the optically contrasting state, also enhances the visibility of the indicia 3. Note that optically contrasting can imply as well that a color change occurs in the layer 1 so that the color or colors of the indicia 3 are discernable against the color or colors of the substrate 2. Note as well that optically contrasting can also imply that a change in a pattern occurs in the layer 1 so that the indicia 3 are discernable against the pattern of the substrate 2.

FIG. 3*a* depicts one embodiment of the invention, wherein the indicia 3 is comprised of materials that do not undergo a phase change. FIG. 3*b* depicts an embodiment distinct from that shown in FIG. 3*a*, wherein the indicia 3 is responsive to a stimulus, and having been subjected to the stimulus, the indicia 3*a* undergoes an optical change prior to the imaging of the indicia 3*a*.

In the embodiment where this invention is used for the application of sort codes in mail systems, the process will generally be implemented in two stages. In the first stage of this application, the invention will be applied to a plurality of substrate 2, in the second stage the plurality of substrate 2 will be imaged and sorted.

Where this invention is used for mail sorting systems, the response time of the layer 1 must meet the requirements of the sorting system. Two microseconds was used as a standard for determination of the adequacy of response time. This standard was determined to be well below the maximum response interval necessary for accurate imaging by the commonly used Accuvision™ mail sorting system, which transports mail pieces at a rate of 110 inches per second.

Figure 8:
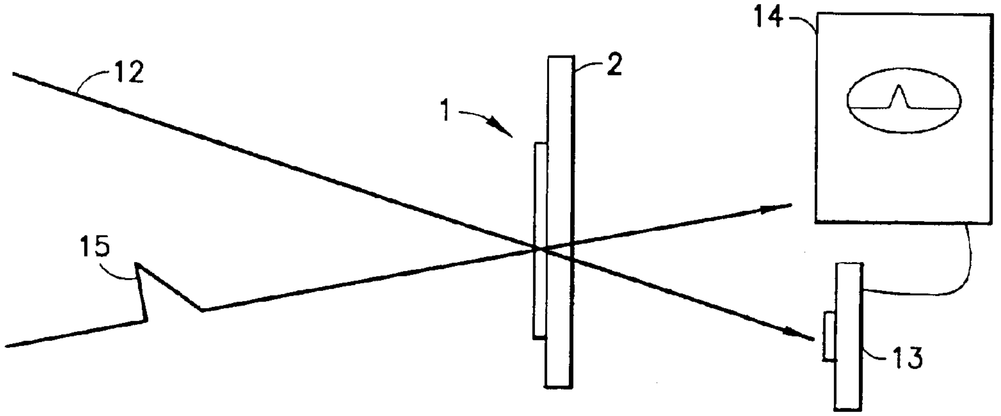
FIG. 8 shows in block diagram form, an experimental setup used to determine photochromic response times.
Figure 9:
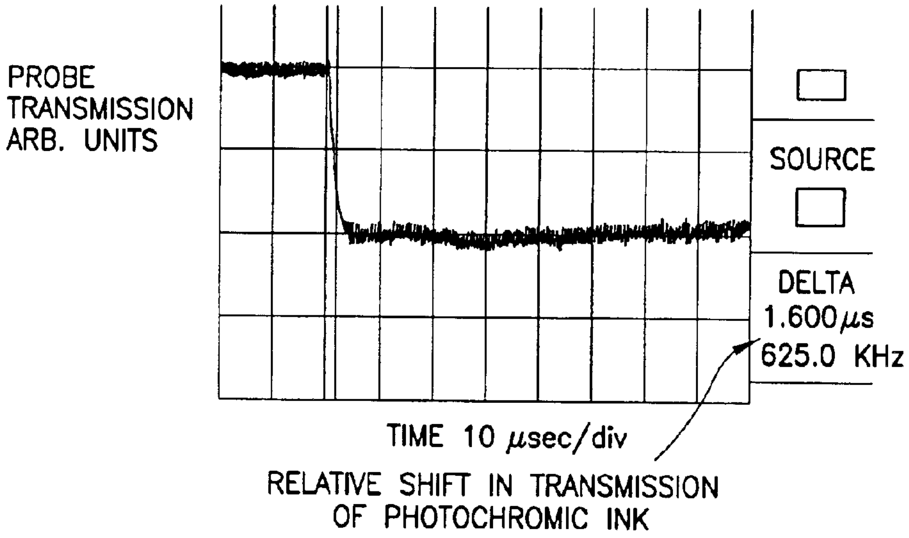
FIG. 9 shows in graphic form, the relative shift in optical transmission of photochromic ink upon receipt of a UV stimulus.

FIG. 8 shows an experimental setup where the response time of a photochromic layer 1 material was determined. In this experiment, a layer 1 was applied over a clear substrate 2. Light from a CW 632.8 nanometer HeNe laser 12 was directed through the layer 1 and clear substrate 2 to a photodiode 13. A one nanosecond rise time photodiode 13 was connected to a 50Ω input of an oscilloscope 14. In this manner, it was possible to monitor the transmissive properties of the layer 1. A pulse of UV light 15 with a wavelength of 355 nanometers and 3 nanoseconds pulse width was used to stimulate the layer 1. Test results determined that the response of the photochromic layer 1A to the UV light 15 occurred in less than two microseconds. Results from the experiment described in FIG. 8 are shown FIG. 9. FIG. 9 shows data from the fast photodiode 13. In addition to showing the change occurred in 1.6 microseconds, the data shows the layer 1A remained in a stimulated state for a substantial period of time in comparison to the stimulation interval.

Figure 4:
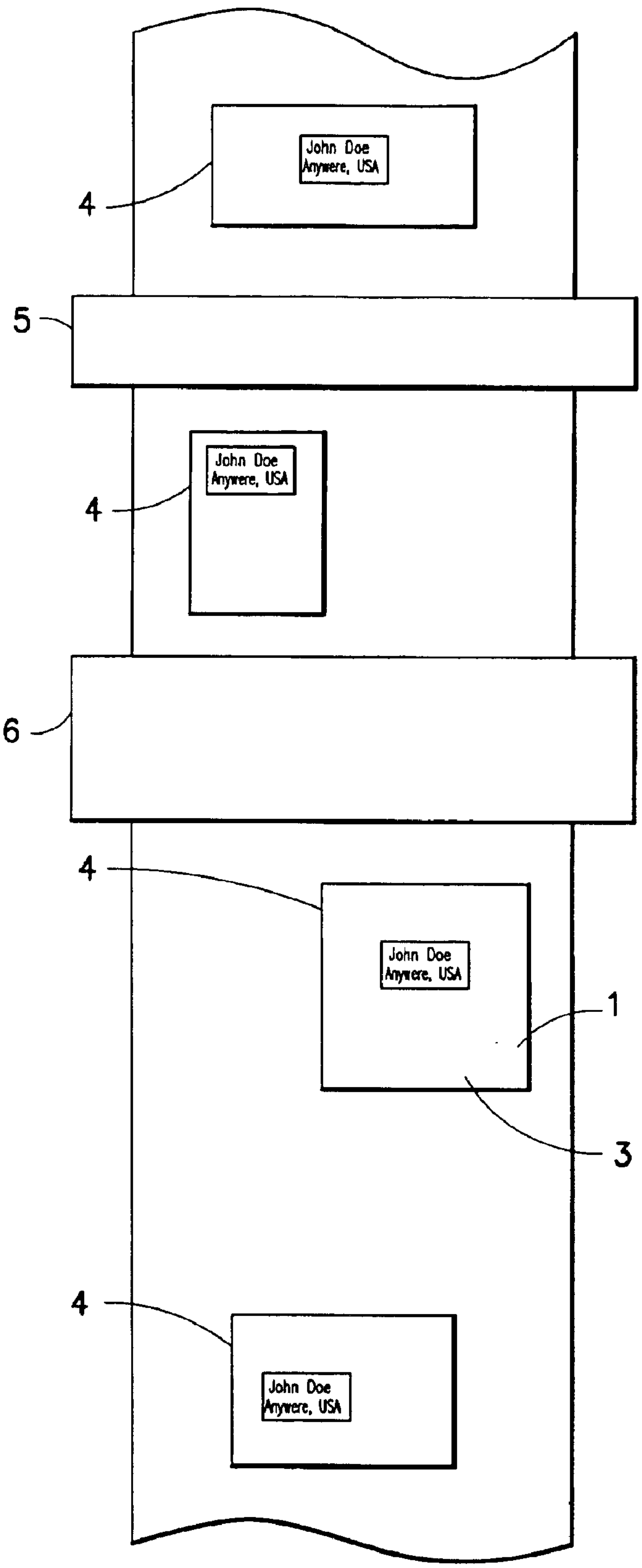
FIG. 4 shows, in block diagram form, a method for application of the layer and indicia to a plurality of mail pieces.

FIG. 4 shows how this invention can be used in a mail sorting application. FIG. 4 depicts an embodiment where a plurality of mail pieces 4 require marking. Note that the mail pieces 4 may have various background patterns as well as colors. In this embodiment of the mail sorting application, the address of each mail piece 4 is scanned by an optical character recognition imaging device 5 that interprets address information for subsequent encoding. This information is used to generate a sort code that is of an appropriate form for the type of sort coding system in use. Once the information needed for encoding indicia 3 has been determined, the information is routed to a layer and indicia application device 6 that applies a layer 1 and an indicia 3 to the substrate 2 of each mail piece 4 containing appropriate sort code information for the mail piece 4. The mail pieces 4 continue through the production line where the mail pieces 4 are aggregated for subsequent handling. In this embodiment both the layer 1 and the indicia 3 are assumed to be normally invisible on the surface of the mail piece 4, and thus do not interfere with the viewing of the background pattern. In another embodiment only the layer 1 might be transparent or substantially transparent.

In another embodiment, information is manually read by personnel, who subsequently apply an appropriate layer 1 and indicia 3. The application of the appropriate layer 1 and indicia 3 may involve various steps, including but not limited to, coding of indicia 3, data entry into an application device for automated application, segregation of mail pieces 4 for subsequent application of the layer 1 and indicia 3, or manual production and affixation of the layer 1 and indicia 3 to the mail piece 4.

Figure 5:
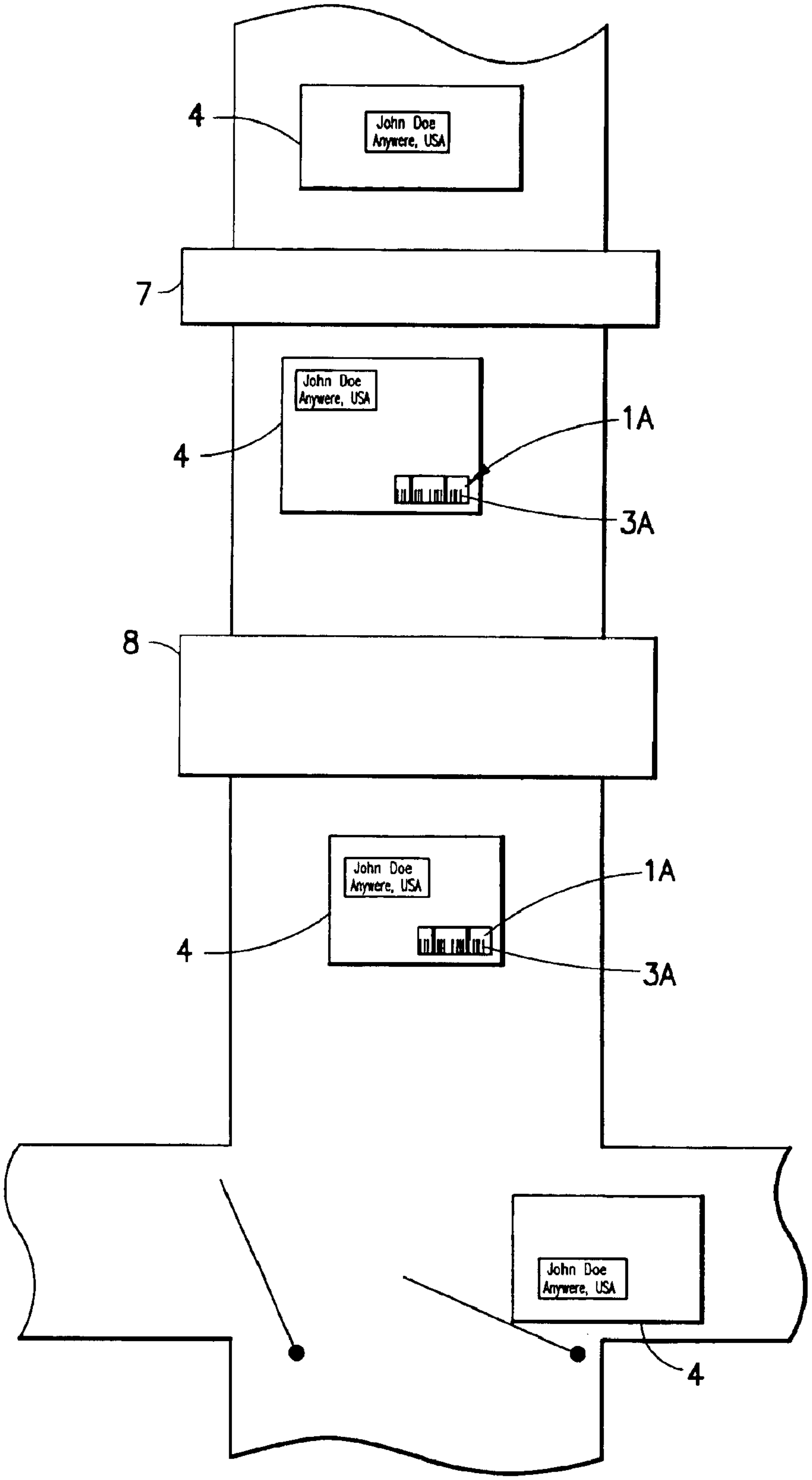
FIG. 5 shows, in block diagram form, a method for imaging the indicia, and using the information obtained from the imaging process for sorting purposes.

FIG. 5 shows one embodiment of a second stage of the mail sorting application. In this embodiment, the mail pieces 4 are loaded into a production line wherein each mail piece 4 is subjected to a stimulus by a stimulus application device 7, wherein the stimulus applied to each mail piece 4 is appropriately delivered for initiation and completion of a phase change in at least layer 1 and possibly also in the indicia 3. Note that after stimulation, such as by thermally stimulating the layer 1 above the LCST threshold, the layer 1 becomes visible as the layer 1A, and forms a contrasting background for the indicia 3A. Before the at least layer 1A and indicia 3A have acclimated to normal environmental conditions, the indicia 3A is read and decoded using an appropriate indicia reading and decoding device 8, such as a bar code scanner, or an imaging device with OCR and/or pattern recognition software, depending on the nature of the indicia 3A. Information derived from the indicia 3A is then used to fulfill the requirements of subsequent sorting applications, which can also include applying another layer 1 and indicia 3 to the mail piece 4, such as one required to decode down to the carrier route level. Note in FIG. 5 that by the time the mail pieces 4 have reached the sorting equipment of a sort path that the layer 1A may have cooled to the point that it crosses through the LCST threshold, and once again becomes transparent or substantially transparent, thereby removing the visually contrasting background from beneath and around the indicia 3.

In accordance with the teachings of this invention, in one embodiment the layer 1 contains a LCST material. Once heated above the LCST, demixing of the polymers occurs and an optical change takes place causing the layer 1 to become at least one of optically absorbing, reflective or scattering. The heating can be done by radiant heating, resistive heating, heating with radio frequency (RF) energy, such as with microwave energy, heating by passing the substrate over or under a heated roller or other structure, or by any suitable process. The material used for the indicia 3 may be a simple ink, such as a black ink or a fluorescent ink, or it may also be comprised of LCST material, or it may be comprised of a photochromic material. The use of the LCST material in the layer 1 provides for the appearance of the indicia 3 over a substantially uniform, optically contrasting background, once heating has stimulated the layer 1 (and possibly also the indicia 3). At this point a suitable indicia 3 reading system can be used to reliably detect and interpret the information encoded by the indicia 3. After reading the indicia 3, the layer 1A and the indicia 3 acclimate to ambient environmental conditions, and the layer 1A, and possibly also the indicia 3, return to the prior transparent or substantially transparent state.

In another embodiment the layer 1 is comprised of transparent or substantially transparent thermochromic material and the indicia 3 are comprised of transparent or substantially transparent photochromic material. A first, thermal stimulus is applied to initiate an optical change in the layer 1, and a second, optical stimulus is applied to initiate an optical change in the indicia 3. After adequate time for imaging has passed, the substrate 2, the layer 1A and the indicia 3A acclimate to ambient environmental conditions. The layer 1A and the indicia 3A preferably return to the prior transparent or substantially transparent state.

In another embodiment, the layer 1 is transparent, substantially transparent or translucent in ambient environmental conditions. The indicia 3 are comprised of a material that is visible under ambient environmental conditions. In this embodiment, the indicia 3 need not change optically upon the application of a stimulus. Once subjected to appropriate stimulus, the layer 1 changes to provide an optically contrasting background, at which point the indicia 3 may be more reliably read with optical imaging equipment. After adequate time for imaging has passed, the substrate 2, the layer 1A and the indicia 3 acclimate to ambient environmental conditions. The layer 1A preferably returns to the prior transparent or substantially transparent state.

In another embodiment, the indicia 3 is comprised of an ink, such as a fluorescent or a visible ink, that is applied over the layer 1. The layer 1 is comprised of transparent or substantially transparent mutually compatible mixtures of polymers that demix above the LCST, and become optically contrasting to the indicia 3. In this embodiment, the indicia 3 need not change optically upon the application of a stimulus. Once subjected to appropriate stimulus, the layer 1 changes to provide an optically contrasting background, wherein the indicia 3 may be read more reliably with optical imaging equipment. After adequate time for imaging has passed, the substrate 2, the layer 1A and the indicia 3 acclimate to ambient environmental conditions. The layer 1A preferably returns to the prior transparent or substantially transparent state.

Figure 6:
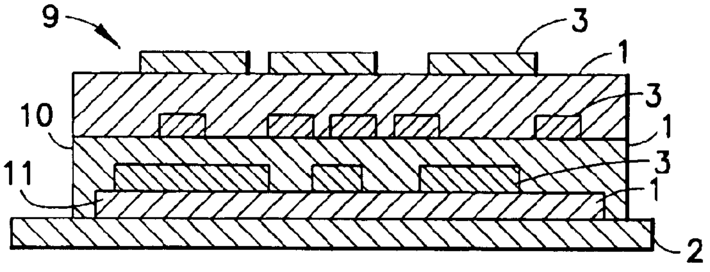
FIG. 6 shows, in cross section, not to scale, a plurality of applications of the layer and indicia.

FIG. 6 shows an embodiment of this invention wherein the invention has been applied in a series, or is "stacked." In this embodiment, each application of the layer 1 and indicia 3 are appropriately chosen to support the requirements of the user. For example, in a three tier application, the top application 9 of the layer 1 and indicia 3 may have an LCST that exceeds the intermediate application 10 of the layer 1 and indicia 3, with the bottom application 11 of the layer 1 and indicia 3 combination having the lowest LCST. This embodiment provides for multiple markings of a single substrate, with the benefit of minimizing expenditure of stimulus, minimizing handling, and reducing substrate 2 surface area requirements.

In one embodiment the materials selected for a stack are distinguished by different wavelength emissions at a specific temperature. In another embodiment, the materials selected for application in a stack are distinguished by similar responses at different temperatures. An example of temperature dependent materials is shown in FIG. 7.

Figure 7:
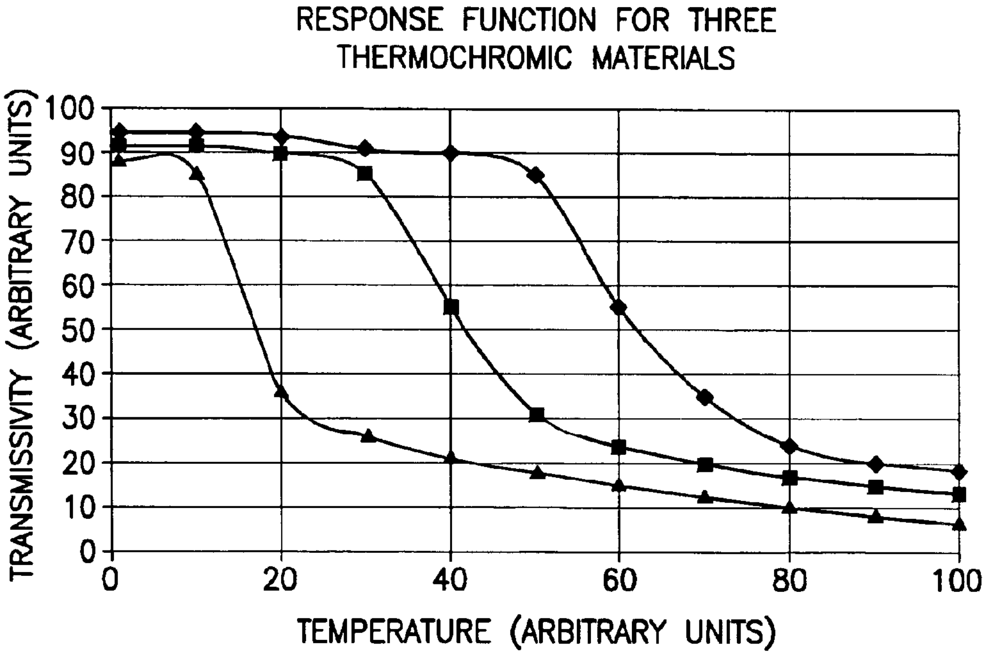
FIG. 7 is a graph showing, in arbitrary units, temperature response curves for a plurality of applications of the layer and indicia. This graph depicts a combination of materials that would be suitable for multiple applications of this invention in one location on a substrate.

FIG. 7 provides a series of example temperature response curves that depict the relationship of three applications of this invention as a stack. Each data set within this graph shows a reduction in the light transmission of each application of this invention within the stacked system as system temperature is increased. The development of temperature response curves as shown in FIG. 7 provides information for setting up an imaging system to read multiple applications of the invention. In this example, an imaging system may be suitably established for examining multiple applications of this invention at the arbitrary transmissivity unit of 80. In this example, each application is separated from the next by approximately 15 to 20 arbitrary temperature units.

While described herein in the context of various presently preferred embodiments, those having skill in the art should appreciate that these teachings should not be viewed as being limiting or restrictive as to the practice of this invention, and that those skilled in the art may derive various changes in form and details to this invention when guided by the foregoing examples of presently preferred embodiments. As such, this invention should be accorded a scope that is commensurate with the scope of the appended claims, and equivalents thereof.

What is claimed is:

1. A method for processing mail, comprising:

providing a mail piece requiring marking;

identifying an address to which said mail piece is to be delivered;

encoding address information for said mail piece;

affixing a layer of material onto said mail piece, said layer being transparent or substantially transparent in a non-stimulated state, said layer reversibly becoming non-transparent upon the application of a stimulus; and affixing a marking upon said layer, wherein said marking carries indicia comprising the encoded address information, and wherein said layer comprises a Lower Critical Solution Binary Polymer Blends and Solutions (LCSPBS) material in at least one of a liquid, a solid solution or a micro encapsulated form.

2. A method for processing mail, comprising:

providing a mail piece requiring marking;

identifying an address to which said mail piece is to be delivered;

encoding address information for said mail piece;

affixing a layer of material onto said mail piece, said layer being transparent or substantially transparent in a non-stimulated state, said layer reversibly becoming non-transparent upon the application of a stimulus; and affixing a marking upon said layer, wherein said marking carries indicia comprising the encoded address information, and wherein said layer comprises at least one color former and at least one Lewis acid introduced into a polymer containing material, wherein said polymer containing material is transparent or substantially transparent below a lower critical solution temperature, said polymer containing material reversibly becoming substantially non-transparent above the lower critical solution temperature.

3. A method for processing mail, comprising:

providing a mail piece requiring marking;

identifying an address to which said mail piece is to be delivered;

encoding address information for said mail piece;

affixing a layer of material onto said mail piece, said layer being transparent or substantially transparent in a non-stimulated state, said layer reversibly becoming non-transparent upon the application of a stimulus;

affixing a marking upon said layer, wherein said marking carries indicia comprising the encoded address information, said indicia are transparent or substantially transparent in a non-stimulated state, and reversibly shift to an optically readable state upon the application of said stimulus; and wherein said indicia comprise at least one color former and at least one Lewis acid introduced into a polymer containing material, wherein said polymer containing material is transparent or substantially transparent below a lower critical solution temperature, said polymer containing material reversibly becoming non-transparent above the lower critical solution temperature.

4. A method for processing mail, comprising:

providing a mail piece requiring marking;

identifying an address to which said mail piece is to be delivered;

encoding address information for said mail piece;

affixing a layer of material onto said mail piece, said layer being transparent or substantially transparent in a non-stimulated state, said layer reversibly becoming non-transparent upon the application of a stimulus; and affixing a marking upon said layer, wherein said marking carries indicia comprising the encoded address information, and wherein at least one application of said layer and marking upon said layer is disposed upon another at least one application of said layer and marking upon said layer, and wherein indicia of each application of said marking is optically readable under a different set of environmental conditions.

5. The method as in claim 4, wherein said indicia of each said at least one application of said layer and marking upon said layer are transparent or substantially transparent in a non-stimulated state and sequentially become optically readable upon a change in environmental conditions.

6. The method as in claim 4, wherein said indicia of at least one application of said layer and marking upon said layer comprises a code used when sorting the mail piece.

7. A method for processing mail, the method comprising:

providing a mail piece requiring marking;

identifying address information for said mail piece;

encoding said address information;

affixing a first layer disposed over the mail piece;

affixing a second layer disposed over said first layer, said and said second layer being substantially transparent in a non-stimulated state, said first layer becoming optically contrasting with respect to the mail piece in response to a first stimulus, said second layer becoming optically contrasting with respect to said first layer in response to a second stimulus; and disposing first indicia on said first layer and second indicia on said second layer, said first and second indicia comprising the address information.

8. The method as in claim 7, where said first stimulus comprises a first temperature, and where said second stimulus comprises a second temperature that is greater than said first temperature.

9. The method as in claim 7, where said first and second indicia are transparent or substantially transparent in a non-stimulated state and become optically readable in response to a respective stimulus.

10. The method as in claim 8, where only said first indicia is readable when exposed to said first temperature, and where said second indicia is readable when exposed to said second temperature.

* * * * *